United States Patent [19]

Touma et al.

[11] Patent Number: 4,791,442
[45] Date of Patent: Dec. 13, 1988

[54] CAMERA SHUTTER USING AN ELECTROSTRICTIVE STRAIN ELEMENT AS A DRIVING SOURCE

[75] Inventors: Kiyoshi Touma; Haruki Oe; Akira Suzuki, all of Tokyo, Japan

[73] Assignee: Copal Company Limited, Tokyo, Japan

[21] Appl. No.: 136,660

[22] Filed: Dec. 22, 1987

[30] Foreign Application Priority Data

Dec. 23, 1986 [JP] Japan ................... 61-197959

[51] Int. Cl.⁴ .............................. G03B 9/14
[52] U.S. Cl. .................... 354/234.1; 354/265
[58] Field of Search ............ 354/226, 234.1, 250, 354/265

[56] References Cited

U.S. PATENT DOCUMENTS 4,234,245 11/1980 Toda et al. ............ 354/234.1 X

Primary Examiner—Michael L. Gellner
Attorney, Agent, or Firm—Spensley Horn Jubas & Lubitz

[57] ABSTRACT

A camera shutter using an electrostrictive strain element as a driving source wherein, in order to make it possible to make the driving voltage small and to make an accurate exposure, when the shutter is released, first a reverse voltage is applied to an electrostrictive strain element to drive a shutter blade opening and closing member in the direction of completely closing the shutter blades, then the charge accumulated in the electrostrictive strain element is discharged and finally a forward voltage is applied to the electrostrictive strain element to open the shutter blades.

3 Claims, 4 Drawing Sheets

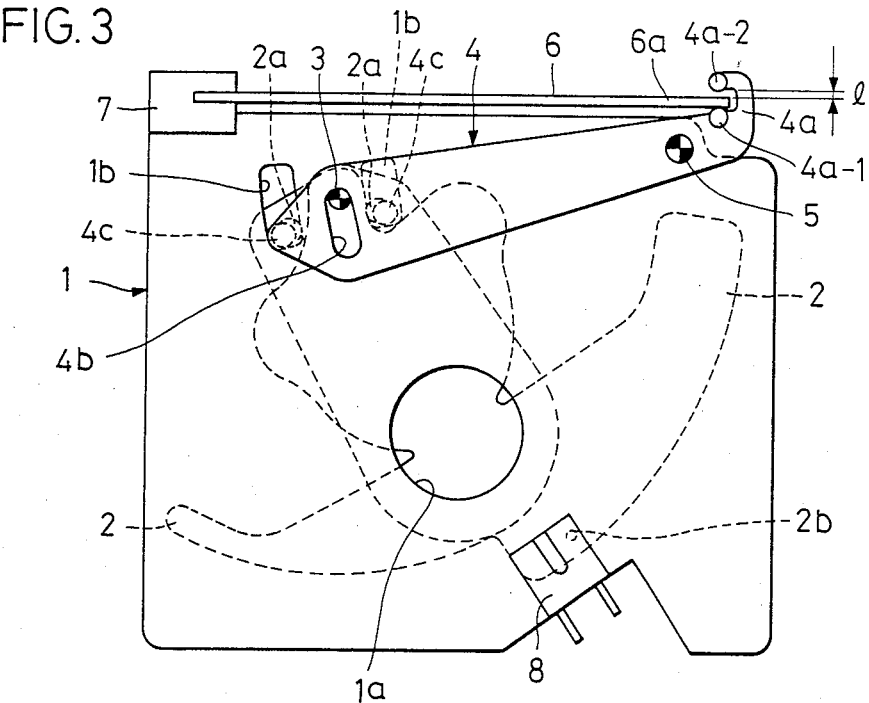
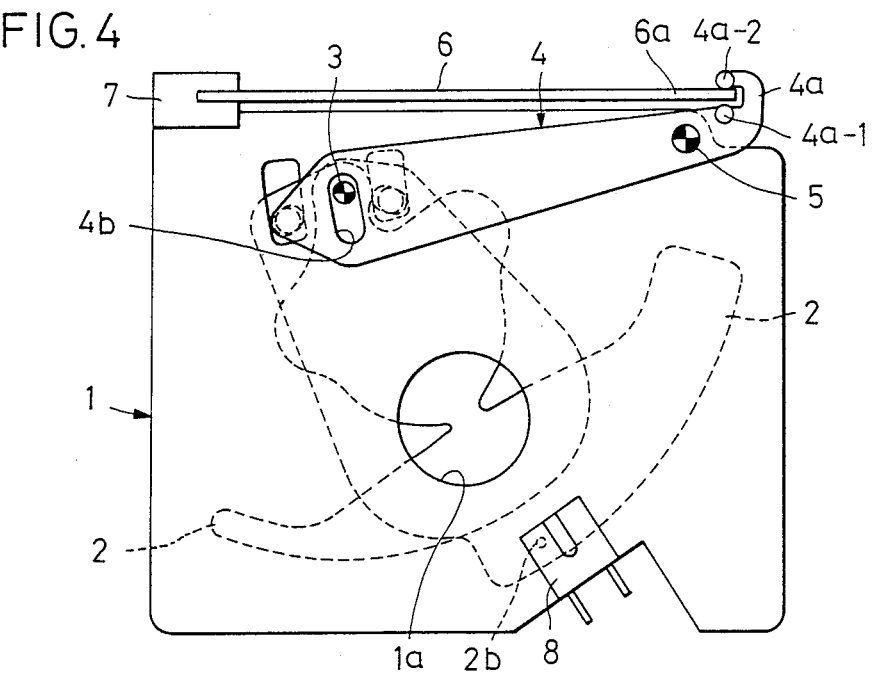

CAMERA SHUTTER USING AN ELECTROSTRICTIVE STRAIN ELEMENT AS A DRIVING SOURCE

BACKGROUND OF THE INVENTION (a) Field of the invention

This invention relates to a camera shutter using an electrostrictive strain element as a driving source and more particularly to a lens shutter using, for example, a bimorph type electrostrictive strain element as a driving source.

(b) Description of the prior art

FIGS. 1 and 2 show an example of a conventional lens shutter for cameras using an electrostrictive strain element as a driving source. FIG. 1 shows the shutter as completely closed and FIG. 2 shows the shutter as fully opened. In the drawings, the reference numeral 1 represents a shutter base plate having an exposure aperture 1a and 2 represents a shutter blade for opening and closing the exposure aperture 1a and pivoted on the back surface of the base plate 1 by a shaft 3 and 4 represents a shutter blade opening and closing lever pivoted on the surface of the base plate 1 by a shaft 5 and having a recess portion 4a for receiving the free end of a later described electrostrictive strain element formed in one end portion and an arcuate slot 4b fitted with the shaft 3 provided in the other end portion. The shutter blade opening and closing lever 4 is rotatable only within a range allowed by this slot 4. Pins 4c, 4c are inserted respectively through arcuate slots 1b, 1b of the base plate 1 and are fitted respectively in slots 2a, 2a of shutter blades 2 located on the back surface of the base plate 1 so that, by the pin-slot connection of these pins 4c, 4c with the slots 2a, 2a the shutter blades 2 may rotate with the rotation of the shutter blade opening and closing lever 4. The reference numeral 6 represents a known bimorph type thin plate-like electrostrictive strain element secured in one end portion to a bracket 7 fitted to the base plate 1 and inserted at the other free end into the recess portion 4a of the shutter blade opening and closing lever 4 with a predetermined clearance l. This clearance l is set by taking the dimensional tolerance and temperature contraction into consideration so that the electrostrictive strain element 6 may not squeak. The electrostrictive strain element 6 is to open and close the shutter blades 2 by engaging at the driving end 6a with either of the first engaging pin 4a-1 and second engaging pin 4a-2. By the way, the above-mentioned clearance l is drawn as exaggerated for the convenience of the illustration.

Therefore, if, for example, a forward voltage is applied from the state shown in FIG. 1 to the electrostrictive strain element 6 and the electrostrictive strain element 6 bends and displaces downward at the driving end 6a, the element 6 will engage at the driving end 6a with the first engaging pin 4a-1 to rotate the shutter blade opening and closing lever 4 clockwise and will open the shutter blades 2 as shown in FIG. 2. If a reverse voltage is applied from the state shown in FIG. 2 to the electrostrictive strain element 6 (or if the electrostrictive strain element 6 is short-circuited between both ends or is earthed to discharge the accumulated charge), the element 6 will engage at the driving end 6a with the second engaging pin 4a-2 to rotate the shutter blade opening and closing lever 4 counterclockwise and will close the shutter blades 2 to return to the state shown in FIG. 1.

In the initial position before the exposure starts as shown in FIG. 1, the driving voltage to the electrostrictive strain element 6 is not applied and the element 6 tends to remain balanced or linear. However, in this initial state, the electrostrictive strain element 6 engages at the driving end 6a with the second engaging pin 4a-2 by its own resiliency and presses the shutter blade opening and closing lever 4 in the blade closing direction. The electrostrictive strain element 6 is shown to be linear in FIG. 1 but should be understood to be somewhat bent in fact.

By the way, in FIGS. 1 and 2, the reference numeral 8 represents a photosensor for detecting a small orifice 2b provided in one shutter blade 2. By the cooperation of the orifice 2b and photosensor 8, the beginning of the opening of the shutter blades 2 is detected and this detecting signal is delivered to a known exposure time measuring means not illustrated to start counting the exposure time.

Now, in the above-mentioned conventional shutter, the total strain amount (total displacement amount) of the driving end 6a of the electrostrictive strain element 6 corresponding to the displacement of the shutter blades 2, 2 from the position shown in FIG. 1 to the fully opened position is shown by $L_0$ in FIG. 2. However, from the position in which the driving end 6a engages with the second engaging pin 4a-2 of the recess portion 4a until it engages with the first engaging pin 4a-1, the displacement of the electrostrictive strain element 6 does not contribute to the operation of opening the shutter blades 2, 2, therefore the strain amount (displacement amount) of the element 6 substantially required to drive the shutter blades 2, 2 is $L_0 - l$ but the electrostrictive strain element 6 must be strained by $L_0$ and some percentage of the displacement amount in one direction of the element 6 has been wasted. Therefore, in a range of a large strain amount, that is, in a range low in the reliability of the responding characteristic, the electrostrictive strain element has had to be used to open and close the shutter blades 2, 2. Thus, an electrostrictive strain element large in the strain amount and therefore requiring a costly large driving voltage has had to be used. There have been such disadvantages.

SUMMARY OF THE INVENTION

Therefore, an object of the present invention is to provide an electrostrictive strain element driven type camera shutter wherein, in a formation in which there is a clearance in the engagement between an electrostrictive strain element and a shutter blade opening and closing member driven by it, there is no wasted component in the strain amount of the electrostrictive strain element required to open and close the shutter blades.

In a camera shutter of the present invention wherein shutter blades are driven by a driving source of a mechanical strain produced in an electrostrictive strain element by the application of a voltage, in order to attain the abovementioned object, an electrostrictive strain element fixed at one end and made at the other a driving part displaceable by a predetermined amount and a shutter blade opening and closing member arranged movably by a predetermined amount and connected to shutter blades for opening and closing an exposure aperture are provided, in order to receive the driving end of the electrostrictive strain element with a clearance, the shutter blade opening and closing member is provided with a recess portion having a first engaging portion engaging with the above-mentioned driving end at the time of opening the shutter blades and a second engaging portion engaging with the above-mentioned driving end at the time of closing the shutter blades and the balanced linear electrostrictive strain element having no voltage applied to it before the exposure starts has first a reverse voltage (for example, a negative voltage) applied to it in releasing the shutter, is engaged at the above-mentioned driving end with the second engaging portion and has them a forward voltage (for example, a positive voltage) applied to it to open the shutter blades.

According to the present invention, in whatever engaged state the driving end of the electrostrictive strain element and the recess portion of the shutter blade opening and closing lever may be, in releasing the shutter, when a reverse voltage is first applied to the electrostrictive strain element, the shutter blades will be brought to the initial position (predetermined completely closed position), when the charge accumulated in the electrostrictive strain element is then discharged, the element will be returned to the balanced linear state, the driving end will be engaged with the first engaging portion of the recess portion of the shutter blade opening and closing lever and therefore all the subsequent strain and displacement of the driving end made when the forward voltage is applied to the electrostrictive strain element will be converted to the motion of opening the shutter blades. Therefore, a shutter of this kind which can make a very accurate exposure can be provided.

This and other objects as well as the features and advantages of the present invention will become apparent from the following detailed description of the preferred embodiment when taken in conjunction with the accompanying drawings.

BRIEF DESCRIPTION OF THE DRAWINGS

FIG. 3 is a plan view showing a lens shutter as completely closed according to the present invention;

FIGS. 4 to 6 are plan views respectively showing operating states different from that of FIG. 3.

DESCRIPTION OF THE PREFERRED EMBODIMENT

Figure 1:
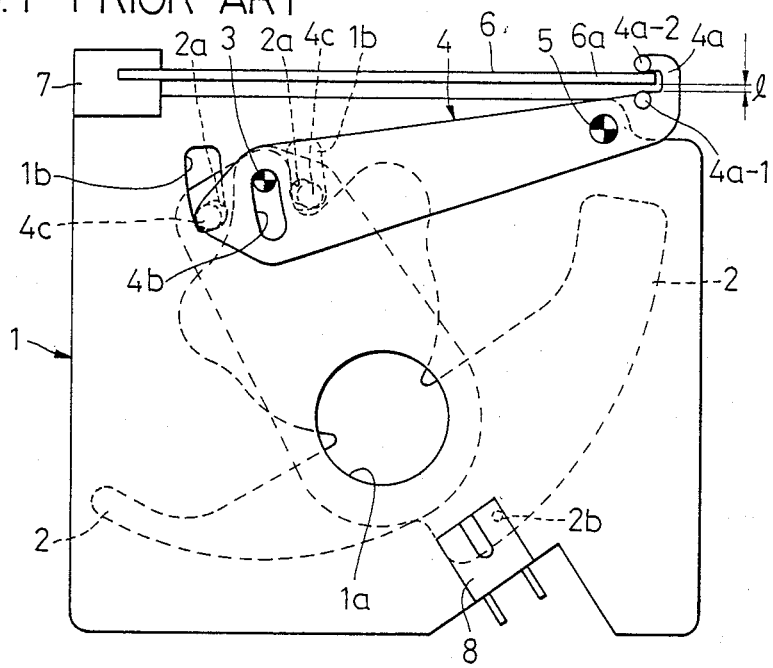
FIGS. 1 and 2 are plan views respectively showing operating states different from each other of an example of a conventional lens shutter using an electrostrictive strain element as a driving source.
Figure 2:
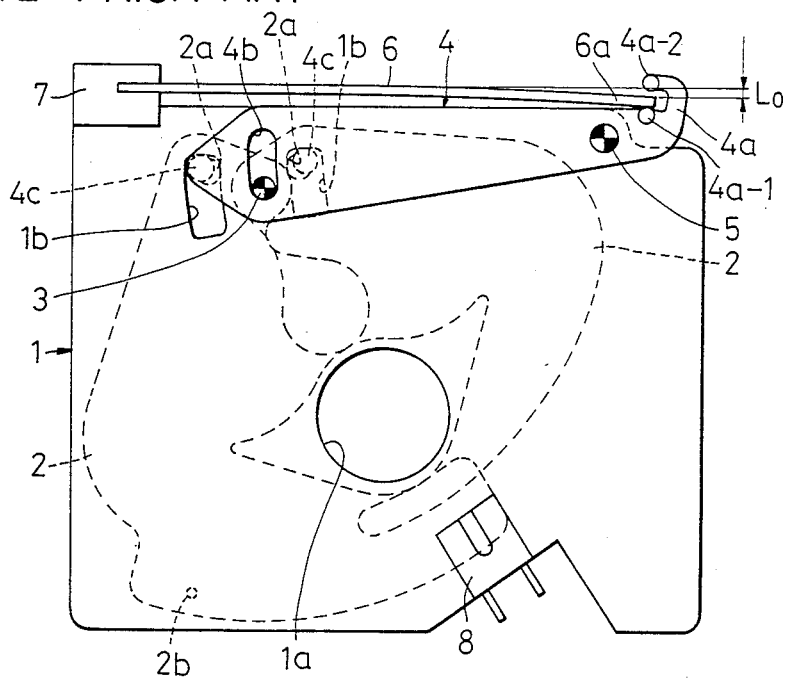
Figure 5:
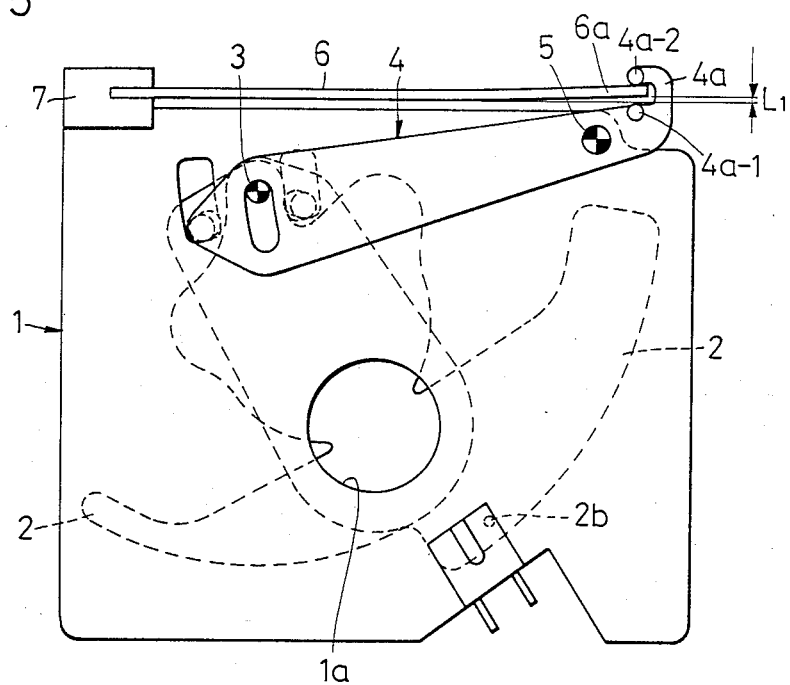
Figure 6:
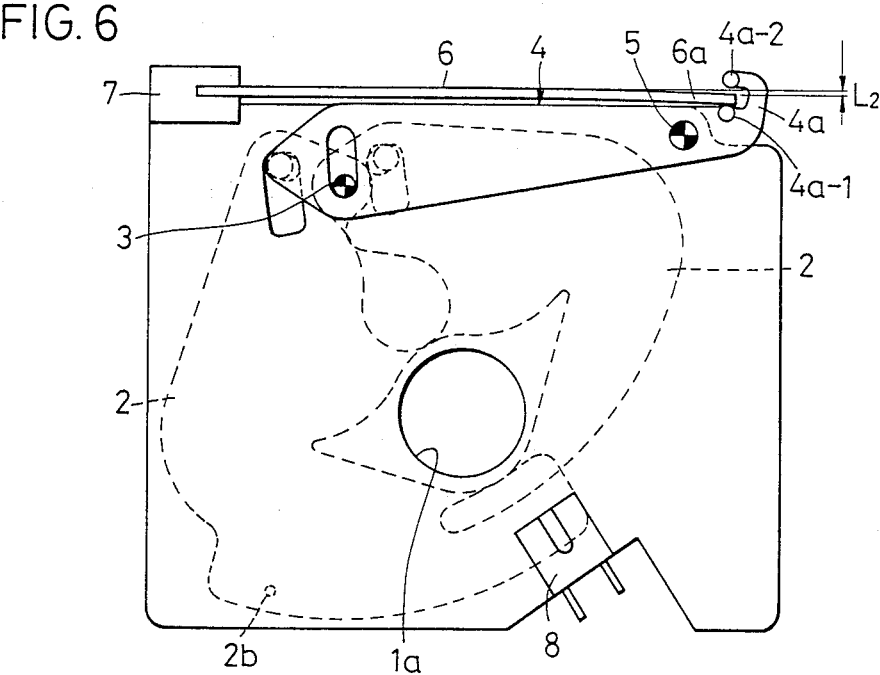

The present invention shall be explained in the following on the basis of the embodiment shown in FIGS. 3 to 6. Substantially the same members and portions as those of the conventional shutter shown in FIGS. 1 and 2 shall bear the same reference numerals and their explanation shall be omitted.

Figure 7:
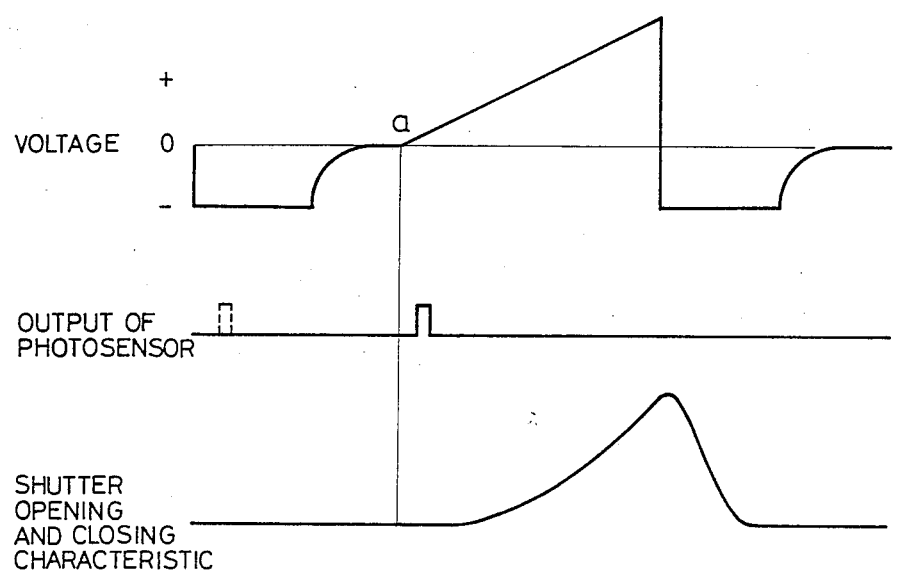
FIG. 7 is a time chart of a shutter operation.

This embodiment is different from the already described conventional example in respect that, when the shutter is completely closed (FIG. 3) before the exposure starts, the dirving end 6a of the electrostrictive strain element 6 will engage with the first engaging pin 4a-1 of the recess portion 4a of the shutter blade opening and closing lever 4. That is to say, in the initial state, the electrostrictive strain element 6 has no driving voltage applied to it and is balanced and linear. The driving end 6a is set to contact the first engaging pin 4a-1 at this time. Therefore, in the initial state, such force pre-pressing the shutter blade opening and closing lever 4 in the blade closing direction as in the conventional example is not acting. Therefore, in the initial state before the exposure, due to a shock or the like, the opening and closing lever 4 can take the position shown in FIG. 4. Then, the small orifice 2b of the shutter blade 2 has passed through the detecting part of the photosensor 8. Therefore, if a forward voltage is applied from this state to the electrostrictive strain element 6 to open the blades 2, 2, the exposure time measuing means will not be able to recognize the opening start of the shutter blades 2, 2. Therefore, in whichever of the FIG. 3 position and FIG. 4 position the opening and closing lever 4 may be, in the initial period of the shutter release, a reverse voltage is applied to the electrostrictive strain element 6 to displace the driving end 6 upward, that is, toward the second engaging pin 4a-2 by a small amount (by $L_1$ in FIG. 5), the driving end 6a is engaged with the second engaging pin 4a-2 of the recess portion 4a and the state shown in FIG. 5 in which the shutter blades 2, 2 are completely closed is once taken. Then, the electrostrictive strain element 6 is shortcircuited between both ends or is earthed to discharge the accumulated charge, the driving end 6a is returned to the position in FIG. 3 (point a in FIG. 7) and then a forward voltage is applied to the electrostrictive element 6 to displace the driving end 6a downward by $L_2$ in FIG. 6 to open the shutter blades 2, 2. In such case, the detected output of the photosensor 8 will be delivered to the above-mentioned exposure time measuring means only while the forward voltage is being applied to the electrostrictive strain element 6. Then, on the basis of a signal issued from the exposure time measuring means to terminate the exposure, a reverse voltage will be applied to the electrostrictive strain element 6, the shutter blades 2 will be closed, the exposure will end, then the accumulated charge of the electrostrictive strain element 6 will be discharged by such method as is described above and all the members will return to the state in FIG. 3.

As described above, in the embodiment, all the strain amount of the driving end 6a is $L_1+L_2$. However, even if $L_1+L_2$ is substantially equal to $L_0$ in the above-mentioned conventional example, as $L_1<L_0$ and $L_2<L_1$, the displacement amount in one direction of the electrostrictive strain element 6 will be smaller than in the conventional example. The displacement $L_2$ of the driving end 6a will be all converted to the operation of opening the shutter blades 2, 2 without being wasted. Therefore, it is possible to use an electrostrictive strain element of a small maximum strain amount and the absolute value of the driving voltage can be also made small.

By the way, in the above-mentioned embodiment, the reverse voltage is applied when the shutter is closed (after the shutter is opened). However, the electrostrictive strain element may be sort-circuited between both ends or may be earthed to discharge the accumulated charge. Thus, various modifications are considered without deviating from the scope of the present invention

What is claimed is:

1. A camera shutter using an electrostrictive strain element as a driving source comprising:
   a shutter base plate having an exposure aperture;
   at least one shutter blade rockably supported on said shutter base plate to open and close said exposure aperture;

an electrostrictive strain element fixed at one end on said shutter base plate and arranged at the other end as a freely displaceable driving end so as to be able to be strained and displaced when a voltage is applied to said electrostrictive strain element and to return to the original form when the accumulated charge is discharged; and a shutter blade opening and closing member supported rotatably and having one end portion engaged with the shutter blade and the other end forming an engaging portion engaged with the drawing end of said electrostrictive strain element with a clearance, said engaging portion of said shutter blade opening and closing member being provided with a first engaging means engaging with the driving end of said electrostrictive strain element when said shutter blade opening and closing member is moved to open the shutter blades and a second engaging means engaged with the driving end of said electrostrictive strain element when said shutter blade opening and closing member is moved to close the shutter blades, and means for applying, when the shutter is released, first a reverse voltage to said electrostrictive strain element to engage the driving end with the second engaging means of said shutter blade opening and closing member and then a forward voltage to said electrostrictive strain element to open the shutter blades.

2. A camera shutter according to claim 1 wherein said electrostrictive strain element is of a bimorph type.

3. A camera shutter according to claim 1 wherein the engaging portion of said shutter blade opening and closing member is formed as a recess in which said electrostrictive strain element is to to be fitted and said first and second engaging means are formed as a pair of pins arranged as opposed to each other with said recess interposed between them.

* * * * *